United States Patent [19]

Kurauchi et al.

[11] Patent Number: 4,769,567
[45] Date of Patent: Sep. 6, 1988

[54] BRUSHLESS DC MOTOR WITH COGGING REDUCTION

[75] Inventors: Tuneya Kurauchi; Tooru Watanabe, both of Iida, Japan

[73] Assignee: Tamagawa Seiki Kabushiki Kaisha, Tokyo, Japan

[21] Appl. No.: 65,314

[22] Filed: Jun. 22, 1987

[30] Foreign Application Priority Data

Jun. 23, 1986 [JP] Japan ............................ 61-144765[U]

[51] Int. Cl.$^4$ ...................... H02K 37/14; H02K 21/14
[52] U.S. Cl. ..................................... 310/156; 310/162
[58] Field of Search .................... 310/49 R, 67 R, 154, 310/156, 162, 177, 51

[56] References Cited

U.S. PATENT DOCUMENTS

| | | | |
|---|---|---|---|
| 3,604,961 | 9/1971 | Saldinger | 310/51 |
| 4,424,463 | 1/1984 | Musil | 310/49 R |
| 4,629,924 | 12/1986 | Grosjean | 310/49 R |
| 4,692,646 | 9/1987 | Gotou | 310/184 |

FOREIGN PATENT DOCUMENTS 3246596  4/1984  Fed. Rep. of Germany ...... 310/162
54-56112  5/1979  Japan ................................ 310/162

Primary Examiner—Patrick R. Salce
Assistant Examiner—D. L. Rebsch
Attorney, Agent, or Firm—Brooks Haidt Haffner & Delahunty

[57] ABSTRACT

A brushless direct current electric motor includes a stator having plural stator teeth at prescribed tooth pitches, exciter coils on the stator, a rotor mounted for rotation in an opening of the stator and plural magnetic poles formed on the peripheral surface of the rotor. According to the invention, the magnetic pole pitch between any given adjacent ones of the magnetic poles is different from the magnetic pole pitches between adjacent ones of said magnetic poles neighboring both sides of the firstly-mentioned adjacent ones of the magnetic poles.

4 Claims, 5 Drawing Sheets

BRUSHLESS DC MOTOR WITH COGGING REDUCTION

BACKGROUND OF THE INVENTION

1. Field of the Invention

This invention relates to a brushless direct current electric motor and more particularly to such motor in which smooth rotational operation may be obtained through elimination of cogging torque otherwise caused during rotor rotation.

2. Related Art Statement

Various constructions have been proposed and adopted in this type of brushless direct current electric motors. Although related publications or literature are not specified herein, the construction commonly used in the prior-art is that in which the pitch of the stator teeth is related to the magnetic pole pitch of the magnetic pole section of the rotor in the manner shown in FIGS. 8 to 11.

FIG. 8 shows in a developed plan view the relation between a magnetic pole section 3 of a rotor, not shown, and the stator teeth 2 of the stator 1 employed in a brushless direct current electric motor. It is seen that the center $O_1$ of a given stator tooth 2 and the center $O_2$ of the magnetic pole part 3 are offset by an angle $\theta$ relative to the tooth pitch Ps of the stator teeth 2.

In general, when the pole part 3 is rotated in the above described state, the cogging torque T fluctuates in the direction of the angle $\theta$ and occurs continually and repeatedly at the tooth pitch Ps or the interval between the adjacent stator teeth 2.

The construction shown in FIG. 10 represents a typical construction of the prior art in which the tooth pitch Ps of the stator teeth 2 provided on the stator 1 is made equal to 20° C.

The respective magnetic pole parts 3 are formed equiangularly on the periphery of the rotor 4. The structure is of six-pole construction with the magnetic pole pitch Pr made equal to 60°.

Thus, when the rotor 4 of the above described prior-art construction is caused to rotate, cogging torque occurs every where in phase so that cogging, several times as large as that shown in FIG. 9, is produced. In short, the magnitude of the produced torque corresponds to that shown in FIG. 9 multiplied by the number of magnetic pole parts 3.

With the above described construction of a conventional brushless direct current electric motor, the amount of cogging torque produced increases in proportion to the increase in the number of rotor poles so that smooth rotation is not achieved when the motor is used for driving control equipment or a VTR.

SUMMARY OF THE INVENTION

It is a principal object of the present invention to overcome these deficiencies and to provide a brushless direct current electric motor allowing to produce smooth rotation with extremely small cogging torque.

Accordingly to the present invention, there is provided a brushless direct current electric motor comprising a stator having circumferentially spaced stator teeth, coil means disposed on said stator for magnetically exciting said stator teeth to provide magnetic stator poles of polarity alternating circumferentially about said stator with said stator poles being equidistantly spaced at a given pitch, Ps, circumferentially about said stator, a rotor mounted for rotation in a rotor opening in said stator, and a plurality of magnetic rotor poles provided on the periphery of said rotor, said rotor poles alternating in magnetic polarity circumferentially of said rotor and being spaced circumferentially, each rotor pole from the adjacent rotor pole, by either a first or a second rotor pole pitch where said first and second rotor pole pitches are respectively less than and greater than a predetermined integral multiple of said pitch Ps.

In the brushless direct current electric motor of the present invention, the magnetic pole pitch Pr between the magnetic pole parts formed in the rotor is not uniform but different in the above described manner such that the cogging torque produced from the north poles is dephased with respect to that produced from the south poles so that these torques cancel each other to provide approximately smoothed torque characteristics.

Since the rotor rotation may be smoothed in this manner, it becomes possible to produce an extremely stable rotatory operation when the present invention is applied to control equipment of various kind, such as VTRs.

BRIEF DESCRIPTION OF THE DRAWINGS

FIGS. 1 to 7 show the brushless direct current electric motor according to the present invention, wherein FIG. 1 is a diagrammatic plan view showing a preferred embodiment of the present invention.

FIG. 2 is a developed plan view showing the essential parts of FIG. 1.

FIGS. 3 and 4 are waveform diagrams showing waveforms of the cogging torque produced at each magnetic pole part shown in FIG. 2.

FIG. 5 is a diagrammatic plan view showing a modified embodiment of the present invention.

FIG. 6 is a sectional view showing the overall structure of the direct current electric motor of the present invention.

FIG. 7 is a sectional view taken along the line X—X' of FIG. 6.

FIGS. 8 to 11 illustrate the conventional brushless direct current electric motor, wherein FIG. 8 is a developed plan view of the motor.

FIG. 9 is a waveform diagram showing the waveform of the cogging torque produced at each magnetic pole part.

FIG. 10 is a diagrammatic plan view of the motor.

FIG. 11 is a developed plan view showing essential parts of FIG. 10.

DESCRIPTION OF THE PREFERRED EMBODIMENTS

Figure 1:
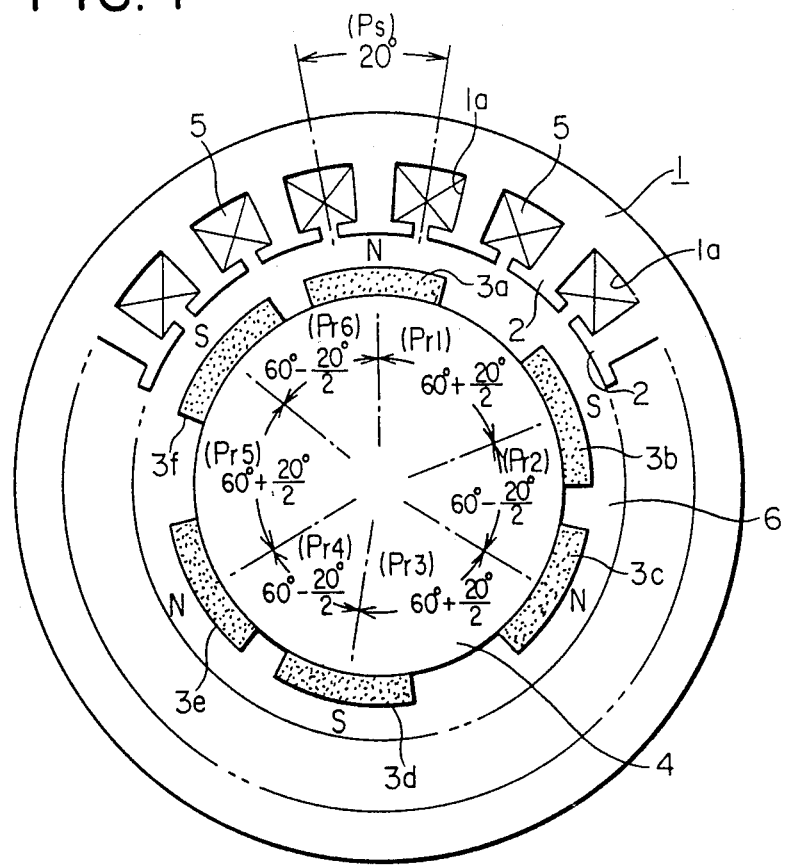

In the accompanying drawings, there are illustrated preferred embodiments of the brushless direct current electric motor according to the present invention. It will be noted that the same reference numerals are used to depict the parts that are the same as or equivalent to those of the above described prior-art device.

Figure 2:
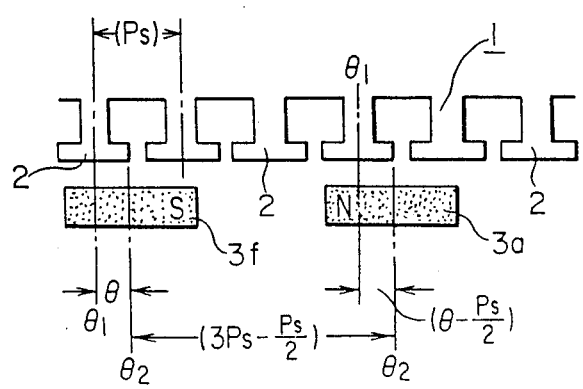

FIGS. 1 to 8 illustrate the brushless direct current electric motor according to the present invention. FIGS. 1 and 2 illustrate the first embodiment of the present invention wherein the tooth pitch Ps between adjacent stator teeth 2 is made equal to 20°.

An exciter coil 5 is accomodated in each attachment slot 1a of the stator 1. The coil 5 is turned on and off by a brushless unit, not shown, consisting essentially of an electronic switching means, also not shown. A rotor 4 is rotatably mounted in a rotor opening 6 formed at the center of the stator 1. On the periphery of the rotor 4 are formed six-pole magnetic pole parts 3a to 3f, with the magnetic parts 3a, 3c and 3e being north (N) poles and the magnetic parts 3b, 3d and 3f being south (S) poles.

The magnetic pole pitch Pr1 between the magnetic pole parts 3a and 3b is $$60° + \frac{20°}{2};$$

the magnetic pole pitch Pr2 between the magnetic pole parts 3b and 3c is $$60° - \frac{20°}{2};$$

the magnetic pole pitch Pr3 between the magnetic pole parts 3c and 3d is $$60° + \frac{20°}{2};$$

the magnetic pole pitch Pr4 between the magnetic pole parts 3d and 3e is $$60° - \frac{20°}{2};$$

the magnetic pole pitch Pr5 between the magnetic pole parts 3d and 3e is $$60° + \frac{20°}{2};$$

and the magnetic pole pitch Pr6 between the magnetic pole parts 3e and 3f is $$60° - \frac{20°}{2}.$$

In this manner, the magnetic pole parts 3a to 3f are arranged so that the adjacent magnetic pole pitches Pr1 to Pr6 are at different angular intervals from each other, such that the magnetic pole pitch Pr between any given adjacent ones of the magnetic pole parts is different from the magnetic pole pitches between adjacent ones of said magnetic pole parts on both sides of the firstly-mentioned adjacent ones of the magnetic pole parts.

The relation between the stator teeth 2 and the magnetic pole parts 3a to 3f shown in FIG. 1 is shown more clearly in the partially developed view of FIG. 2. It is seen from this figure that the magnetic pole pitch Pr between the magnetic pole parts 3a and 3f is $$3Ps - \frac{Ps}{2},$$

and that the angle between the center $\theta_2$ of the magnetic pole part 3f and the center $\theta_1$ of the stator tooth 2 is $\theta$, while that between the center $\theta_2$ of the magnetic pole part 3a and the center $\theta_1$ of the stator tooth 2 is $$\theta - \frac{Ps}{2}.$$

Figure 6:
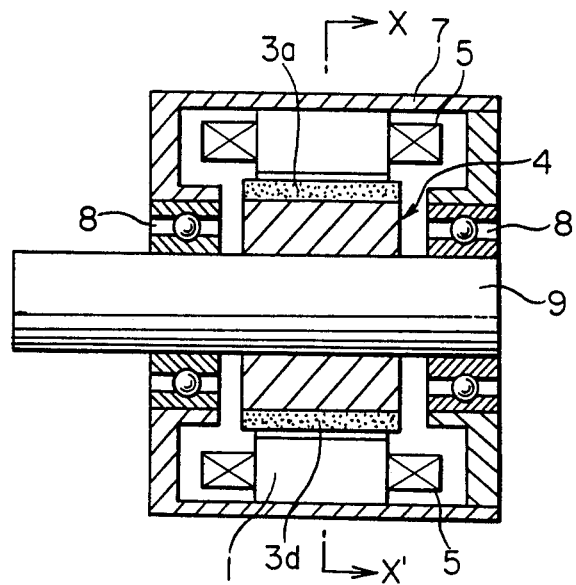
Figure 7:
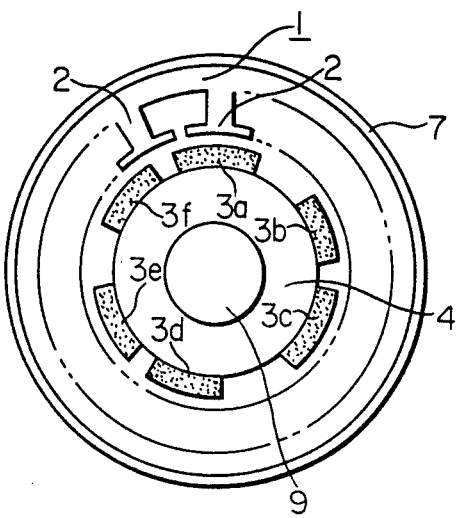
Figure 8:
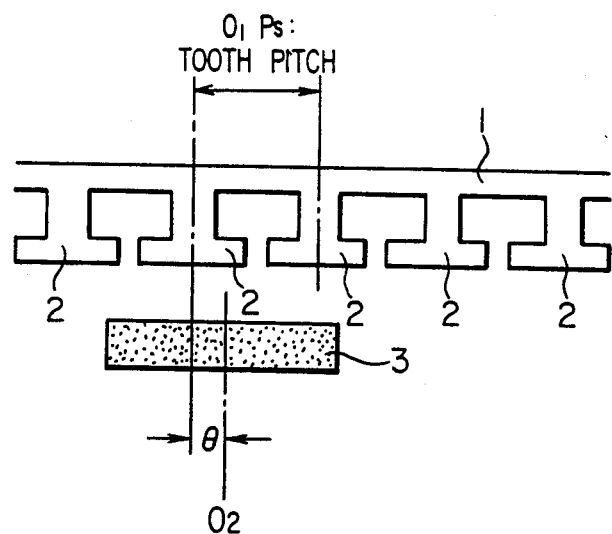
Figure 9:
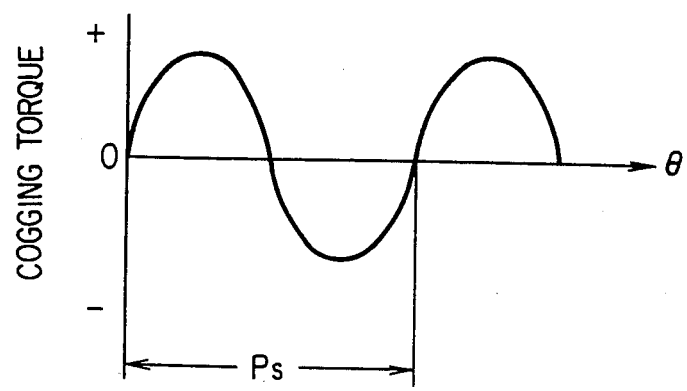
Figure 10:
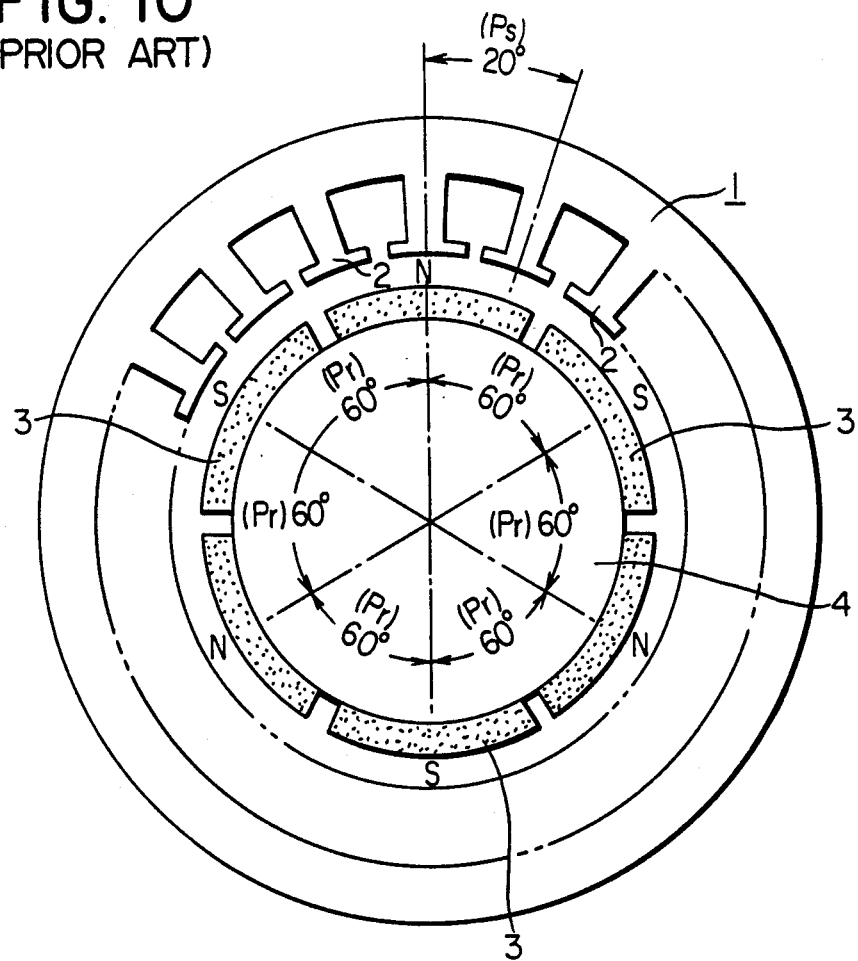
Figure 11:
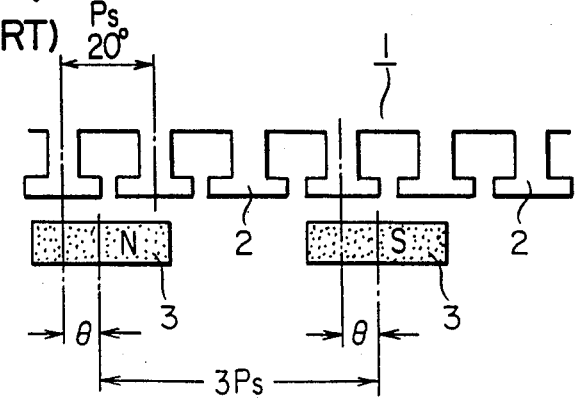

In FIGS. 6 and 7, there is illustrated a brushless direct current electric motor which uses the stator 1 and the rotor 4 shown in the first embodiment of the present invention shown in FIGS. 1 and 2.

Referring to these figures, the stator 1 is fixedly mounted in a cylindrical housing 7. A rotary shaft 9 formed integrally with the rotor 4 is mounted for rotation in a pair of bearing units 8 on both ends of the casing 7.

Figure 3:
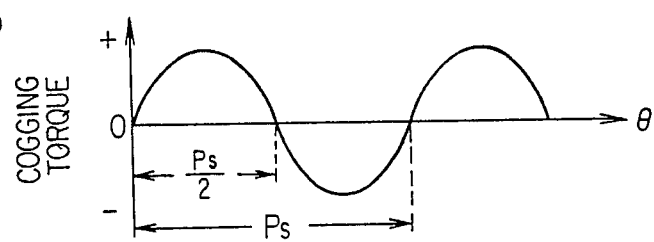
Figure 4:
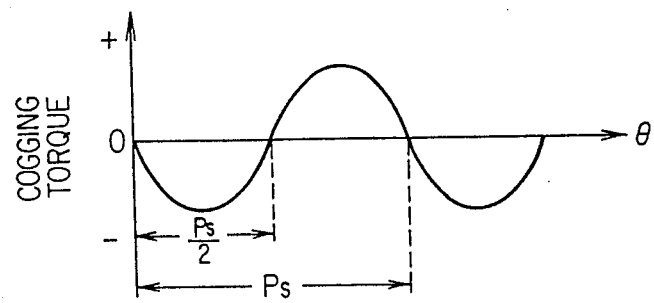

In the above described arrangement of the brushless direct current electric motor of the present invention, the driving electric current is supplied to each exciter coil 5 through an electronic switching means, not shown, so that the rotor 4 starts to rotate in the predetermined direction by the magnetic coaction between the magnetic pole parts 3a to 3f and the stator teeth 2. At this time, the cogging torque associated with the magnetic pole part 3f (S pole) shown in FIG. 2 is as shown in FIG. 3, while the cogging torque associated with the magnetic pole part 3a shown in FIG. 2 is as shown in FIG. 4.

Thus the cogging torque associated with the magnetic pole part 3a is 90° out of phase with that associated with the magnetic pole part 3f, so that they cancel each other to produce a smooth torquing state.

Figure 5:
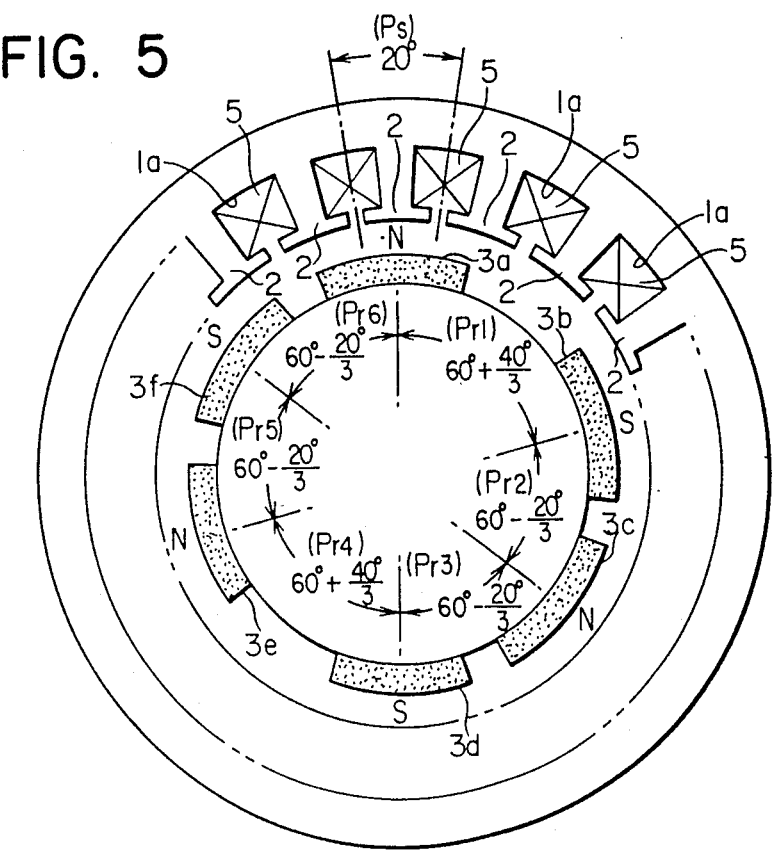

FIG. 5 illustrates a modified embodiment of the present invention in which the disposition of the magnetic pole parts 3a to 3f of the rotor 4 is slightly changed from that of FIG. 1. Thus the magnetic pole pitch Pr1 between the magnetic pole parts 3a and 3b is $$60° + \frac{40°}{3},$$

the magnetic pole pitch Pr2 between the magnetic pole parts 3b and 3c is $$60° - \frac{20°}{3},$$

the magnetic pole pitch Pr3 between the magnetic pole parts 3c and 3d is $$60° - \frac{20°}{3},$$

the magnetic pole pitch Pr4 between the magnetic pole parts 3d and 3e is $$60° + \frac{40°}{3},$$

the magnetic pole pitch Pr5 between the magnetic pole parts 3e and 3f is $$60° - \frac{20°}{3}$$

and the magnetic pole pitch Pr6 between the magnetic pole parts 3f and 3a is $$60° - \frac{20°}{3}.$$

While the present invention has been described with reference to the particular illustrative embodiments, it is not to be restricted by those embodiments. For example, the operation and result similar to that described hereinabove can be realized by using a pitch different from that used in the above described embodiments. Although the six-pole rotor has been used in these embodiments, the number of poles may be smaller or larger without departing from the scope of the present invention. Also the same operation and result can be achieved whether the magnetic pole parts are affixed to the rotor, or the latter is directly magnetized to the polarities corresponding to those of the magnetic pole parts.

What is claimed is:

1. A brushless direct current electric motor comprising a stator having circumferentially spaced stator teeth, coil means disposed on said stator for magnetically exciting said stator teeth to provide magnetic stator poles of polarity alternating circumferentially about said stator with said stator poles being equidistantly spaced at a given pitch, Ps, circumferentially about said stator, a rotor mounted for rotation in a rotor opening in said stator, and a plurality of magnetic rotor poles provided on the periphery of said rotor, said rotor poles alternating in magnetic polarity circumferentially of said rotor and being spaced circumferentially, each rotor pole from the adjacent rotor pole, by either a first or a second rotor pole pitch where said first and second rotor pole pitches are respectively less than and greater than a predetermined integral multiple of said pitch Ps.

2. A brushless direct current electric motor according to claim 1, wherein said stator pole pitch, Ps, is 20°, and said first and second rotor pole pitches are respectively $60° + 20°/n$ and $60° - 20°/n$ where n is an integer greater than one.

3. A brushless direct current electric motor according to claim 2, wherein n is equal to 2.

4. A brushless direct current electric motor according to claim 1, wherein said stator pole pitch, Ps, is 20°, and said first and second rotor pole pitches are respectively $60° + 40°/3$ and $60° - 20°/3$.

* * * * *